Sept. 18, 1928.

R. S. MOORE

COTTON CHOPPER

Filed Sept. 29, 1926

Richard S. Moore, Inventor

Witnesses

Patented Sept. 18, 1928.

1,684,711

UNITED STATES PATENT OFFICE.

RICHARD S. MOORE, OF SNYDER, TEXAS.

COTTON CHOPPER.

Application filed September 29, 1926. Serial No. 138,538.

The present invention relates to improvements in cotton choppers and has for its primary object to provide an apparatus designed to cut certain of the cotton plants from the row to thin the plants.

A further object of the invention is the provision of a cotton chopping apparatus which will be automatically operated by the movement of the carrier frame to swing the choppers transversely of the path of travel so as to cover the entire row of plants.

A still further object of the invention is the provision of a cotton chopping apparatus of the above character having a vertically reciprocating chopper which may be intermittently operated to cut certain of the plants from the row.

Still another object of the invention is the provision of a cotton chopper of the above type which includes a cultivator apparatus therewith.

Another object of the invention is the provision of a cotton chopper of improved construction which will be exceedingly efficient in operation, durable of construction and which can be manufactured at a relatively low cost.

Other objects and advantages of the invention will become apparent as the discussion progresses.

In the accompanying drawings, forming a part of this application, and in which like reference characters are employed to designate corresponding parts, it will be seen:

Figure 1:
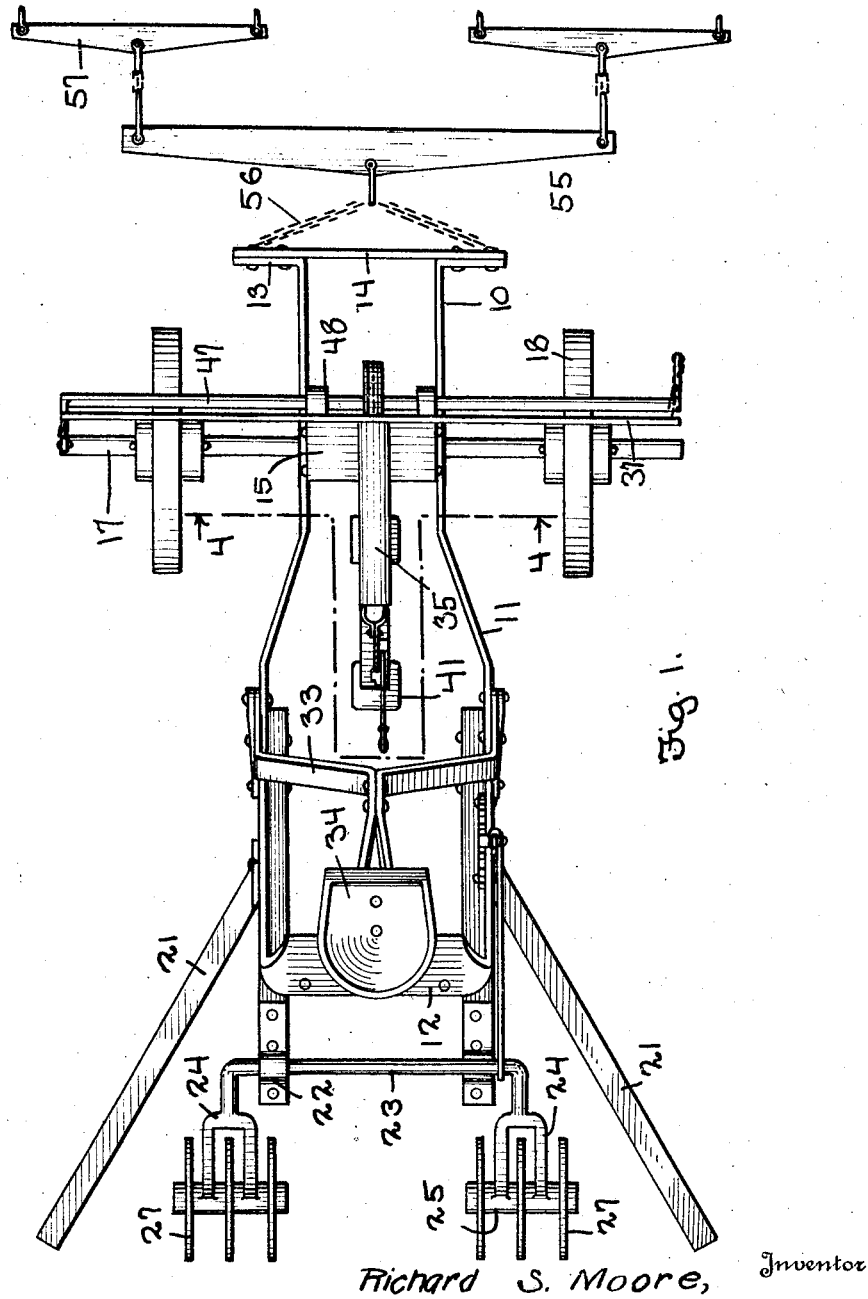
Figure 1 is a top plan view of my improved apparatus.
Figure 2:
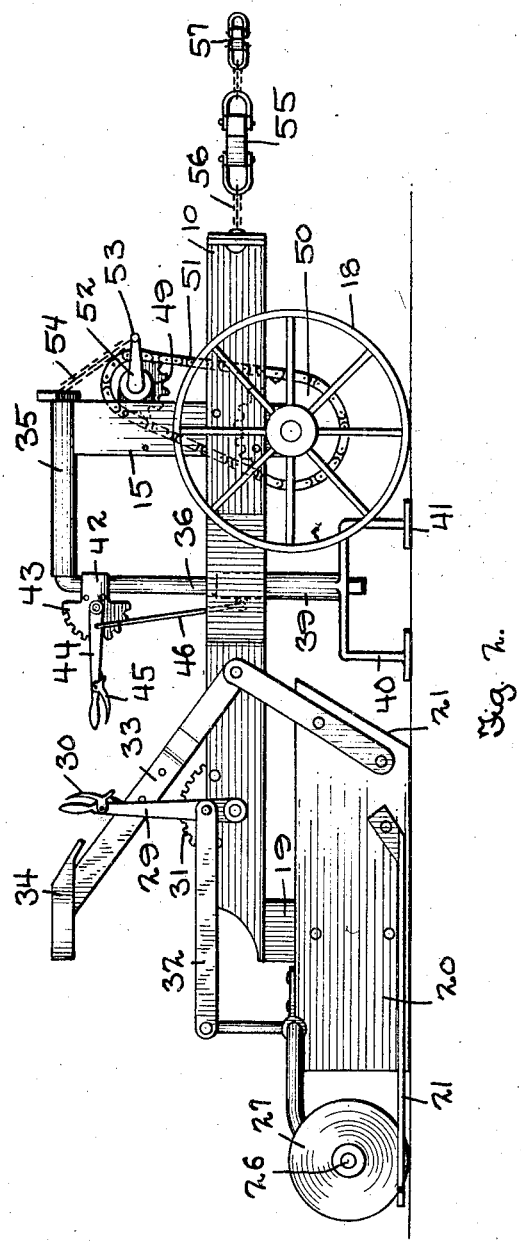
Figure 2 is a side elevational view of the same.
Figure 3:
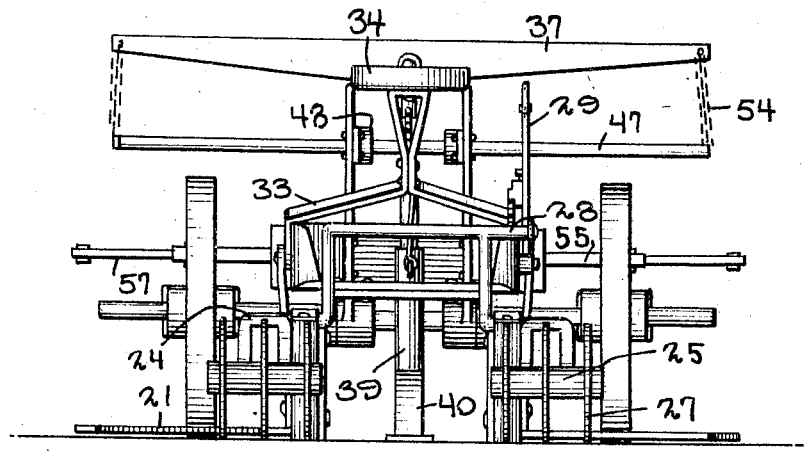
Figure 3 is the rear end view of the assembled structure.
Figure 4:
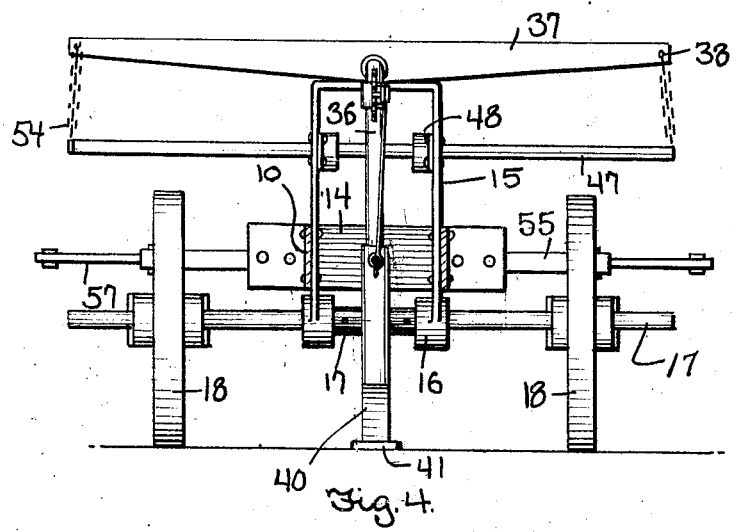
Figure 4 is a vertical transverse sectional view taken on the line 4—4 of Figure 1.

Referring to the drawings, wherein for the purpose of illustration is shown the preferred embodiment of my invention, the numeral 10 generally designates the frame of the machine, this frame being of rectangular formation and having its intermediate portion tapered as at 11 to provide a comparatively wide rear section and a narrow forward section. This frame is constructed of a flat metal bar having its rear end portion bent in a horizontal plane as at 12 and its forward ends bent outwardly in transverse positions as at 13. A front bar 14 is bolted or otherwise secured to the ends 13 and projects transversely at the forward portion of the frame.

Secured to the forward portion of the frame is a U-shaped frame bracket 15, arranged in vertical position and having its major portion projecting vertically upward from the frame. The lower side portions of the bracket 15 project slightly below the frame and are formed with bearing sleeves 16. An axle 17 is rotatably mounted in the sleeve 16 and carries on its outwardly projecting ends a pair of ground wheels 18 rigidly connected with the axle and rotatable therewith. It will be noted that the axle 17 extends substantially from both sides of the frame and the wheels are laterally adjustable so as to vary the position of the wheels in accordance with the varying width of the rows.

A second inverted U-shaped bracket 19 is secured to the rear transverse beam of the frame and extends downwardly in a vertical position therefrom. Rigidly secured to the vertical legs of the bracket 19 and extending longitudinally in parallel positions on the sides thereof are a pair of beams 20, these beams being preferably of wooden construction and comparatively rectangular in shape, the forward edges being cut at a slight angle as indicated at 21 for the convenient movement over the ground. The side beams 20 form rear runners for the machine and are normally run over the surface of the ground.

Secured to the outer sides of the runner beams 20 and extending in rearwardly directed oblique positions are a pair of scraper arms 21, the major portion of the arms 21 being arranged in horizontal positions and the inner ends are bent upwardly for connection with the runner. These scrapers serve as fenders for the machine and are also utilized for pulverizing clods or lumps of dirt.

Secured upon the upper edges of the beams 20 are a pair of bearing brackets 22, these brackets being adapted to rotatably support a transversely mounted harrow shaft, 23. The intermediate portion of the harrow shaft 23 is offset and the ends are bent at right angles to the major transverse portion and formed with U-shaped extensions 24. Formed on the outer rear end of the U-shaped extensions 24 and arranged in transverse alignment are sleeves 25, adapted to support transverse shafts 26, extended through the sleeves for connection of the disc harrow 27.

From this construction it is apparent that each U-shaped extension 24 is arranged to support three harrow discs which may be swung in a vertical arc about the harrow shaft 23 for vertical adjustment. The harrow discs are adjusted by providing a right angular vertically extending arm 28 formed integral with or secured to the offset harrow shaft 23 and aperture adjacent to its upper end. A control lever 29 is pivotedly mounted on the outer side of the main frame 10, adjacent to its rear end, this lever carrying a spring pressed trigger 30 adjacent to its upper handle end. This trigger is adapted to actuate an adjustable finger with a toothed quadrant 31 secured to the frame 10 adapted to maintain the harrow discs 27 in adjusted position. A connecting bar 32 is pivotedly connected with the upper end of the member 28 and adjacent the lower arm of the lever 29, permitting operation of the harrows by swinging movement of the lever.

A seat supporting frame 33 is secured upon the main frame and projects upwardly at an angular inclination, the seat 34 being secured at the upper end of the frame 33 in a convenient position.

An essential feature of my present invention resides in the provision of a chopper mechanism which will be automatically oscillated transversely of the path of travel of the machine during the movement thereof and which is manually operable to reciprocate vertically, cotton hoes for cutting out undesirable plants.

This mechanism comprises a horizontal longitudinally extending sleeve 35 rigidly secured on the upper transverse bar of the forward frame bracket 15. An L-shaped rod 36, including an upper horizontal extension and a vertical downwardly projecting portion is supported in the sleeve 35. The upper horizontal extension of the rod 36 is rotatably mounted in the sleeve, the forward end projecting slightly beyond the forward extremity of the sleeve. A transversely extending rocker bar 37 is secured to the forward projecting end of the L-shaped rod 36, this rocker bar being rigidly secured to the forward extension of the rod and provided with openings adjacent its ends.

A chopper is slidably associated with the rod 36, this chopper including a tubular body 39 slidably fitted over the vertical portion of the rod 36 and has an inverted U-shaped chopper bracket 40 secured to its lower end. A pair of flat horizontal shoes 41 are formed integral with lower ends of the chopper bracket 40 and are intermittently engageable with the ground. The chopper is manually raised or lowered by an actuating mechanism composed of a bracket 42 rigidly secured adjacent the upper end of the rod 36 on which is formed a toothed quadrant 43. Pivotally connected with the central portion of the quadrant and adapted to be swung in a vertical arc thereabout is an actuating lever 44, this lever carrying an adjusting mechanism 45 engageable with the quadrant to lock the lever in position. The lever 45 and chopper are connected by means of a rod 46, the upper end being pivotally connected with the lever while the lower end connects with a laterally projecting ear formed on the body of the chopper. Thus by vertical operation of the lever 44, the chopper is vertically reciprocated from an elevated position out of contact with the ground to a downward position to chop out undesirable plants.

As the machine progresses over the rows of plants, the chopper is transversely oscillated automatically swinging the vertical extension of the rod 36 transversely in the path of travel of the machine. This is effected by providing a transversely mounted shaft 47 supported for rotary movement in a transverse horizontal position in a pair of transversely aligned bearings 48 secured to the vertical side members of the forward frame bracket 15. Fixed to the central portion of the shaft 47 and rotatable in a vertical plane is a sprocket wheel 49 arranged in an elevated vertical plane with a second comparatively large sprocket wheel 50 secured on the central portion of the axle 17. A chain 51 is trained over these sprockets 49 and 50 for simultaneous movement of the same. The ends of the shaft 47 are formed with right angular cranks 52, crank pins 53 being mounted in the outer free ends of the cranks disposed directly beneath the outer end of the rocker bar 37. A pair of comparatively short chains 54 are connected with the openings 48 adjacent to the outer end of the rocker bar and with the crank pins 53 so as to actuate the rocker bar. It will be particularly noted that the crank pins 53 are formed in opposed positions so as to continuously rock the arm 37 during the movement of the machine. Thus, the chopper is transversely operated by the rotatable movement of the machine axle which in turn rotates the transverse shaft 47 whereby the transverse rocker arm is continuously oscillated. As the rocker arm is secured to the outer end of the rod 36, the lower vertical extension of the rod will be transversely oscillated and the chopper swung in a transverse plane.

Secured to the forward portion of the machine frame is a main draft bar 55, attached to the frame by means of a chain 56 and having single-trees 57 pivotally connected with its outer ends. The single-trees are arranged so that the draft animals will travel between the rows of plants while the chopper mechanism will be carried over the plants and actuated to chop out certain of the plants to thin the row.

In operation as the machine is drawn down each row of cotton plants, the rod 36 and the chopper will be automatically oscillated transversely to the path of travel. Thus, it will be readily apparent that a compact and efficient machine for chopping out cotton plants has been produced, presenting a structure which is durable, yet comparatively simple in construction.

It is to be understood that the form of my invention herein shown and described is to be taken as the preferred example of the same, and that various changes as to the shape, size and arrangement of parts may be resorted to without departing from the spirit of the invention or the scope of the subjoined claims.

Having thus described my invention, I claim:

1. In a cotton chopping machine, a longitudinal support frame, an axle journaled transversely on the forward portion of the frame, a pair of runners secured to the rear portion of the frame, ground wheels secured to the outer ends of the axle a sprocket wheel secured to the intermediate portion of the axle, a transverse shaft adapted for rotatable movement in an elevated position on the frame, a sprocket wheel affixed on said transverse shaft, a chain trained over the sprocket wheels on the axle and the last mentioned shaft for a simultaneous operation thereof, a rocker bar mounted for rocking movement in an elevated position on the frame and operatively connected to said transverse shaft, an L-shaped chopper supporting rod mounted for swinging movement on the frame and secured to the rocker bar, a chopper mounted for reciprocating movement on the chopper rod, and mechanism for manually reciprocating the said chopper on the rod.

2. In a cotton chopper, including an elongated support frame, an axle mounted in the forward portion of the frame, a pair of ground wheels secured to the axle and rotatable therewith, a pair of runners secured to the rear portion of the frame, a transverse shaft rotatably supported on the upper portion of the frame, sprockets secured to the said shaft and to the axle, a chain trained over the sprockets and adapted to rotate the transverse shaft simultaneously with the rotation of the axle, an L-shaped chopper supporting rod having its upper horizontal extension mounted for swinging movement on the frame, a rocker arm secured to the forward end of the said horizontal extension, means whereby the said transverse shaft will continuously rock the rocker bar, a chopper mounted for vertical sliding movement on the vertical extension of the chopper rod, and mechanism for manually reciprocating the chopper on said rod.

3. In a cotton chopping machine including a rectangular shaped frame, a bracket secured in the forward portion of the frame, an axle mounted in transverse position rotatably supporting the lower portion of the bracket, a pair of ground wheels secured to the axle, a pair of runners secured to the rear portion of the frame, a transverse shaft mounted for rotary movement adjacent the upper portion of the frame bracket, a sprocket secured to the central portion of the shaft, a second sprocket secured to the central portion of the axle, a chain trained over the said sprockets, an L-shaped chopper supporting rod having the upper horizontal extension mounted for swinging movement on the frame, a transversely extending rocker arm secured to the forward end of the chopper rod, and a pair of chains connected to the ends of the rocker arm and with cranks formed on the ends of the transverse shaft to rock the rocker arm during the rotary movement of the shaft.

4. In a cotton chopping machine construction, a swingingly mounted rod, a plurality of cutting shoes adjustably mounted on said rod, control means for adjusting said shoes and power means for rocking said rod including a rocker bar fixed to one end of the first mentioned rod.

In testimony whereof I affix my signature.

RICHARD S. MOORE.